(12) United States Patent
Lindhorst-Ko (10) Patent No.: US 6,725,401 B1
(45) Date of Patent: Apr. 20, 2004

(54) OPTIMIZED FAULT NOTIFICATION IN AN OVERLAY MESH NETWORK VIA NETWORK KNOWLEDGE CORRELATION

(75) Inventor: Gwenda Lindhorst-Ko, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 581 days.

(21) Appl. No.: 09/695,969

(22) Filed: Oct. 26, 2000

(51) Int. Cl.[7] .................................................. H02H 3/05
(52) U.S. Cl. ......................................... 714/47; 709/105
(58) Field of Search ........................... 714/47, 3, 4, 25, 714/48; 709/104, 105, 106, 224, 225, 226

(56) References Cited

U.S. PATENT DOCUMENTS

| | | | | |
|---|---|---|---|---|
| 5,430,729 A | * | 7/1995 | Rahnema | 370/409 |
| 6,112,249 A | * | 8/2000 | Bader et al. | 709/239 |
| 6,151,688 A | * | 11/2000 | Wipfel et al. | 714/48 |
| 6,542,934 B1 | * | 4/2003 | Bader et al. | 709/239 |

OTHER PUBLICATIONS

Control of Lightpaths in an Optical Network—Sid Chaudhuri, et al.
Fast Restoration of MPLS Label Switched Paths—Stephen Shew, Nortel Networks, Oct. 1999.
Multiwavelength Optical Networks, A Layered Approach—Thomas E. Stern, et al.

* cited by examiner

Primary Examiner—Dieu-Minh Le
(74) Attorney, Agent, or Firm—Kent Daniels; Ogilvy Renault (57) ABSTRACT

Failures within a communications network are compensated for by establishing a set of two or more communications paths across the network between a source node and a destination node. At the source node a status of each one of the set of communications paths is maintained, and the data traffic is load-balanced across those ones of the set of communications paths having an operational status. In the event of failure of a physical network resource, a failure notification message is propagated to the source node, which registers a non-operation status of each path traversing the failed resource. Load-balancing of the data traffic continues across the remaining operational paths. Traffic may be prioritized based on service level agreements and quality of service protection guarantees.

62 Claims, 3 Drawing Sheets

| Service Level | Protection Guarantee | Case 1 all 3 paths good | Case 2 1 path failed | Case 3 2 paths failed |
|---|---|---|---|---|
| Gold | 1 | 1 | 1 | 1 |
| Silver | 0.5 | 2 | 2 | 1 |
| Bronze | 0.2 | 5 | 1 | 1 |
| Min. Bandwidth Req'd | | 8 | 4 | 3 |
| Aggregate Available Bandwidth | | 9 | 6 | 3 |

OPTIMIZED FAULT NOTIFICATION IN AN OVERLAY MESH NETWORK VIA NETWORK KNOWLEDGE CORRELATION

CROSS-REFERENCE TO RELATED APPLICATIONS

This is the first application filed for the present invention.

MICROFICHE APPENDIX

Not Applicable.

TECHNICAL FIELD

The present invention relates to data communications networks having a mesh topology, and in particular to optimized fault notification in an overlay mesh network by correlating knowledge of network topology to paths traversing the network.

BACKGROUND OF THE INVENTION

Modern data communications networks are designed using a layered architecture, in which each layer provides a constellation of services and functionality, most of which are based upon a particular view of the network topology. A first layer of the network architecture (typically referred to as layer-1, or the physical layer) provides services and functionality related to the physical transport of data through physical links (e.g. optical fibre, co-axial cable etc.) between physical nodes of the network. The layer-1 view of the network topology involves knowledge of physical nodes and links which in optical networks are typically arranged in a Bi-directional Line Switched Ring (BLSR) topology. Within this environment, the Synchronous Optical Network (SONET) protocol (and/or its European equivalent, the Synchronous Data Hierarchy (SDH) protocol) is generally employed to accomplish transport of data through the network.

Typically, at least two logical layers (commonly referred to as layer-2 and layer-3) overlay the physical layer. These logical layers provide enhanced connectivity services, and are typically based on a mesh view of the network, in which every node may, in principal, have a direct connection to every other node. As is well known in the art, such a mesh topology, in combination with applicable communications protocols (e.g. Internet Protocol (IP) and Asynchronous Transfer Mode (ATM)) can provide a highly flexible and fault tolerant network architecture.

The mesh network architecture has been proposed as means for improving physical layer performance, with IP, ATM or some other mesh-based communications protocol (e.g. Multi-Protocol Label Switching (MPLS) of Constraint based Routing-Label Distributed Paths (CR-LDP)) used to control the transport of data. However, an advantage of the BLSR topology is that failure of physical network resources (e.g. the severing of an optical fibre link) can be detected very rapidly, and data traffic rerouted to restore communications paths with minimal delay (typically on the order of 50–100 mSec.). By contrast, layer-2/3 mesh protocols generally require a very long time to detect a physical resource failure (on the order of seconds), and still more time (again, on the order of seconds) to discover an alternate communications path for restoring communications. Such a long restoration delay is frequently unacceptable to network service providers. Consequently, efforts have been made to improve the restorative performance of layer-2/3 protocols.

For example, IETF draft <draft-shew-lsp-restoration-00.txt>, dated October 1999, proposes that alarm messages generated in layer-1 can be passed to layers 2 and 3 at intersection points of the layer-1 (typically BLSR) and layer-2/3 (typically mesh) networks. This facilitates rapid notification of layer-1 network resource failures and allows more rapid response of the layer-2/3 local path repair functionality. However, this draft does not address the slow response of layer-2/3 local path repair algorithms, and restoration delays remain unacceptably long. Accordingly, while the mesh topology is used for logical connectivity in layers 2 and 3, the BLSR network topology remains popular for physical data transport.

While the ring topology is capable of rapidly detecting physical resource failures and re-routing traffic to restore communications, ring networks suffer from the disadvantage that this functionality necessitates only partial utilization of network resources. In particular, in order to ensure that traffic can be re-routed around a failed resource, the total network capacity of ring networks is divided between working resources (i.e. resources that are utilized for data transport during normal operations) and protection resources, which are held in reserve and are only used to carry data traffic in the event of failure of a physical resource in some portion of the network. Because layer-1 protocols cannot distinguish between,different types of data, all of the data traffic within a ring must be treated with the same priority and guaranteed level of service. This requirement results in a 1:1 ratio between working resources and protection resources in the network, so that the utilization of network resources under normal operating conditions is about 50%. Since physical resource failures are generally quite rare, it is common for approximately 50% of the total network transport capacity to be idle at any one time.

Due to increasing user demand for bandwidth, the costs associated with provisioning a ring network are forcing network service providers to search for alternative means of providing protection resources, so that the proportion of the total network resources devoted to failure protection can be reduced. Various methods for reducing protection resources have been proposed. For example, co-pending and co-assigned U.S. patent application Ser. No. 09/471,139, filed on Dec. 23, 1999 and entitled METHOD OF DEACTIVATING PROTECTION FIBER RESOURCES IN AN OPTICAL RING NETWORK, teaches a method of reducing overall provisioned protection resources by eliminating duplication of protection fibre on spans that carry traffic of two adjacent rings. On such spans, a single protection fiber can be provided. The single protection fibre is shared between both rings, thereby providing a 2:1 ratio of working bandwidth to protection fibre on those spans. The success of this arrangement relies on the low probability that simultaneous physical failures will cause both rings to attempt to switch their respective working traffic onto the single protection fibre. On spans that are not shared between adjacent rings, which may comprise a majority of spans within the network, a 1:1 ratio must still be maintained, and this tends to diminish the overall improvement in the utilization of the total network bandwidth capacity.

Accordingly, a method and apparatus for rapidly compensating for physical network resource failures, while allowing efficient utilization of network resources during normal operations, remains highly desirable.

SUMMARY OF THE INVENTION

An object of the present invention is to provide a method and apparatus for rapidly compensating for physical network resource failures.

A further object of the present invention is to provide a method and apparatus for compensating for physical network resource failures, in which a requirement for explicit provisioning of protection bandwidth is substantially eliminated.

A further object of the present invention is to provide a method and apparatus for compensating for physical network resource failures in which a graceful degradation of service is possible in an event of simultaneous physical network resource failures.

Accordingly, an aspect of the present invention provides method compensating for network resource failures in a communications network. A set of at least two communications paths are established across the network between a source node and a destination node. The set of communications paths are at least partially physically diverse. At the source node, a path database is established to maintain information identifying network resources traversed by each communications path. The source node also monitors a status of each one of the set of communications paths, and the data traffic is load-balanced across those ones of the set of communications paths having an operational status.

A further aspect of the present invention provides a node of a communications network adapted for compensating for network resource failures in the communications network. The node comprises: means for establishing a set of two or more communications paths across the network to a destination node, the set of communications paths being at least partially physically diverse.; a path database adapted to maintain information identifying network resources traversed by each communications path; means for monitoring a status of each one of the set of communications paths; and means for load-balancing the data traffic across those ones of the set of communications paths having an operational status.

Another aspect of the present invention provides a system for compensating for network resource failures in a communications network comprising a plurality of nodes interconnected by links. The system comprises: means for establishing a set of two or more communications paths across the network between a source node and a destination node, the set of communications paths being at least partially physically diverse.; a path database adapted to maintain information identifying network resources traversed by each communications path; means for monitoring a status of each one of the set of communications paths; and load-balancing the data traffic across those ones of the set of communications paths having an operational status.

In embodiments of the invention, each communications path may be any one of an ATM-SVC, a Label Switched Path (LSP) and a SONET/SDH path-level connection.

Each one of the set of communications paths may be established by launching a path setup message from the source node. A resource allocation message may be received at the source node, the resource allocation message including information identifying a network resource traversed by the communications path. A path array may be updated on the basis of the information identifying the network resource.

The resource allocation message may be generated by a node in the communications path as network resources of a downstream hop are allocated to the communications path.

In embodiments of the invention, the path array comprises, for each communications path, a respective path record having a path identifier field and a plurality of resource fields, each resource field corresponding to one or more network resources which may be traversed by a communications path. Each network resource may include any one or more of: a physical network link; a physical network node; a logical connection between a pair of network nodes; a SONET/SDH section; and a SONET/SDH line. Each resource field may correspond to a single network resource, or alternatively may correspond to a logical combination of two or more network resources.

The path array may be updated by inserting an indicator flag into the respective resource field corresponding to the resource identified in the resource allocation message. The indicator flag may be a binary "1".

In embodiments of the invention, the physical diversity of each of the set of communications paths can be verified. Verification of the physical diversity of each of the set of communications paths may be accomplished by adding the resource fields of the respective path records.

In embodiments of the invention, the status of each one of the set of communications paths may be monitored by: receiving a failure notification message including information indicative of a failed network resource; and setting a non-operational status of each communications path that traverses the failed network resource.

The failure of a network resource may be detected at a detecting node proximal the failed resource, possibly using a conventional layer-1 link failure detection technique. The failure notification message may be generated in the detecting node and propagated toward the source node. The failure notification message may be a substantially conventional layer-1 link failure alarm message, including a link identifier indicative of the failed resource. The failure notification may be propagated within layer-1 until it is received at the source node. At each node within the network, the failure notification may be launched into every upstream link from which the node is receiving traffic, so that the failure notification is propagated toward every edge node sourcing traffic destined for points downstream of the failed resource.

A non-operational status of each communications path that traverses the failed network resource may be set by: searching the path array to identify each path that traverses the failed resource; and updating a respective status field associated with each identified path to indicate a non-operational status of the corresponding path. Alternatively, the path array can be searched, and a respective path record associated with each identified path deleted from the path array.

Searching of the path array may be accomplished by means of conventional searching algorithms using a resource identifier of the failed resource as an array index. Thus the identifier of the failed resource can be used to identify a resource field corresponding to the failed resource, and then the path array searched to identify path records having a resource indicator in the identified resource field. Alternatively, the path array can be searched by: defining a mask of the failed resource; and ANDing the mask with the path array.

In embodiments of the invention, the data traffic may be load-balanced by prioritizing the traffic based on one or more of predetermined service level agreements and QoS requirements. A flow of lower-priority traffic may be reduced such that a total bandwidth requirement is less than or equal to an aggregate bandwidth capacity of those ones of the set of communications paths that are in an operational state. The flow of lower priority traffic may be reduced to a minimum amount calculated using a predetermined protection guarantee, which may form part of a service level agreement.

An advantage of the present invention is that data traffic is continuously load-balanced across the available operational communications paths. As a result, data traffic can be automatically routed away from non-operational communications paths, thereby providing automatic compensation for physical network resource failures, without having to specifically provision protection bandwidth. By placing the path topology information (i.e. the path array), and the load-balancing functionality within the source node, the time required to respond to a network resource failure is minimized, and the need for centralized network management is reduced.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method and apparatus for conveying data traffic through a network between source and destination nodes, which enables high speed compensation for physical resource failures in the network, without requiring explicit provisioning of protection resources.

Figure 1:
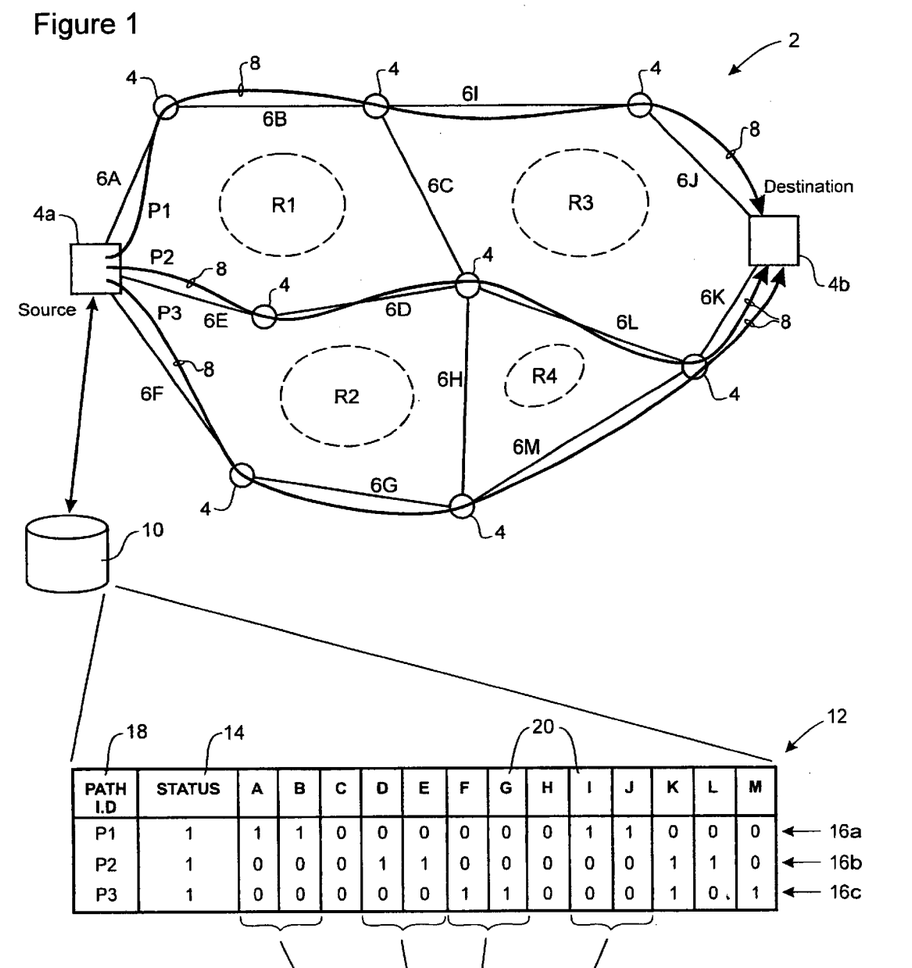
FIGS. 1 and 1a are block diagrams schematically illustrating an embodiment of the present invention deployed in a communications network having a ring architecture.

FIG. 1 illustrates an exemplary network 2 in which the present invention may be deployed. As shown in FIG. 1, the network 2 comprises a plurality of nodes 4 interconnected by physical links 6A–6M to form four adjoining rings R1–R4 which may, for example, be Bi-directional Line Switching Rings (BLSR's). The nodes 4 may be any of conventional concentrators, cross-connects, routers, service access points, add-drop multiplexors etc., known in the art. The links 6 between each of the nodes 4 may be optical fibres, data channels within a fibre (i.e. a wavelength of a Wavelength Division Multiplex (WDM) communication system), router-to-router links (which may include any of several devices including, for example, line cards, medium dependent adaptors, optical fibre, amplifiers, and possibly other nodes located in the data transmission path between a pair of routers), or any SONET/SDH section-level or line-level connection. The links 6 may also be layer 2/3 logical links previously mapped over known (or at least known to be physically diverse) layer-1 network infrastructure.

As mentioned above, the network 2 shown in FIG. 1 is typically constructed using a ring topology, and may be provisioned using a conventional BLSR infrastructure. However, as will be explained below in greater detail, the conventional provisioning of protection resources within the BLSR network is eliminated, so that the entire bandwidth capacity of each link 6 within the network 2 can be committed to active data transport. In addition, the conventional BLSR link failure signaling may be eliminated as redundant in view of the decommissioning of provisioned protection fibre, or alternatively modified (as will be described below) for use with the present invention.

As shown in FIG. 1, a plurality of communications paths 8 are established across the network 2 between a source node 4a and a destination node 4b. In this respect, it will be appreciated that the network 2 may have many nodes 4 sourcing traffic destined for the destination node 4b. Similarly, the source node 4a may in fact be sourcing traffic destined for several destination nodes. However, for simplicity, a single source node/destination node pair is illustrated. Traffic flows within label switched paths are normally uni-directional, so that bi-directional traffic flows are enabled by establishing two paths between a common pair of nodes. However, traffic flow within each of the paths 8 between the source node 4a and the destination node 4b may be either uni-directional or bi-directional. For the purposes of the present invention, the source node 4a is considered to be that node 4 from which the establishment of the communications paths 8 to the destination node 4b was initiated, irrespective of the direction of data flow along those paths 8 during a subsequent communications session. Each of the paths 8 provides a channel for data communication between the source and destination nodes, and may conveniently be set up using conventional layer 2 and/or layer 3 techniques. Thus, for example, the paths may be label switched paths (e.g. set up using MPLS or CR-LDP) or ATM-SVC's. Physical transport of data along each of the paths may be accomplished in accordance with conventional layer-1 protocols such as SONET and SDH. It will be appreciated that in embodiments in which the layer-1 topology is a mesh, conventional mesh-based protocols (e.g. IP, ATM, MPLS, CR-LDP etc.) may be used to control physical transport.

As shown in FIG. 1, the source node 4a maintains a resource data base 10 which provides the source node 4a with a view of the physical layer of the network. In the illustrated embodiment, the resource data base 10 includes a path array 12 identifying physical resources of the network 2 traversed by each path 8 originating at the source node 4a. The resource data base 10 also provides information concerning an operational status of each path 8 within the path array 12. This status information may be provided as a status field 14 within the path array 12 as shown in FIG. 1, or alternatively may be provided in a separate table (not shown) within the resource data base 10. As shown in FIG. 1, the path array 12 may be conveniently divided into path records 16a–c (schematically illustrated as each row of the path array 12) with each path record 16 containing a path identifier field 18 that stores a respective path identifier, and a plurality of resource fields 20, each of which corresponds to respective resources of the network 2.

In order to provide rapid identification of non-operational paths in the event of a network resource failure, the resource fields 20 (schematically illustrated as each column of the path array 12) are indexed by the resource identifier of each network resource. Thus in the exemplary embodiment illustrated in FIGS. 1 and 2, the resource fields 20 of the path array 12 are indexed by resource identifier labels "A"–"M", corresponding to links 6A–6M. As will be described in greater detail below, this arrangement enables the source node 4a to rapidly identify non-operational paths by using the resource identifier information contained in received failure notification messages.

Figure 1A:
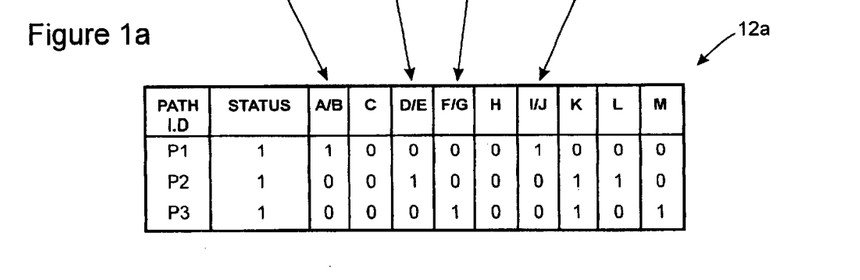

In the illustrated embodiment, a separate resource field 20 is provided which corresponds to each respective link 6A–6M of the network. However, in real networks, this may result in an unreasonably large path array. This problem can be alleviated by recognizing that some links 6 of the network 2 can be logically combined. For example, it will be seen that in the network of FIG. 1, any communications path 8 that traverses link 6A must necessarily traverse link 6B, so that both of these links (6A,6B) may be represented together by a single resource field 20 in the path array 12. A similar logical combination of links 6 can be made for links 6D and 6E; 6F and 6G; and 6I and 6J to produce a condensed path array 12a such as is illustrated in FIG. 1a.

During the setup of each communications path 8, resource allocation messages are sent back to the source node 4a in order to notify the source node 4a of each physical network resource (in the illustrated embodiment each link 6) traversed by the respective path 8. For example, the establishment of an MPLS Label Switched Path (LSP) through the network is conventionally initiated by the source node 4a which launches a path set-up message toward the destination node 4b. As the path set-up message propagates through the network 2 towards the destination node 4b, intermediate network nodes 4 receiving the path set-up message allocate network resources to the LSP before forwarding the path set-up message through a downstream link towards the destination node 4b. This conventional functionality can be extended so that a resource allocation message (containing information identifying the allocated resource) is also sent over the upstream link to retrace the LSP back to the source node 4a. Upon receipt of the resource allocation message, the source node 4a updates the appropriate path record 16 of the path array 12 by inserting an indicator flag (e.g. a binary "1") into the resource field 20 corresponding to the physical network resources identified in the resource allocation message. The source node 4a is thereby provided with information concerning the physical network topology, at least to an extent to which paths 8 originating at the source node 4a traverse physical resources of the network 2. When each path 8 is successfully terminated at the destination node 4b, the status field 14 of the respective path record 16 can be updated to indicate that the path 8 is operational.

In general, the ability of the network to satisfy service level agreements and quality of service (QoS) guarantees for data transport between the source and destination nodes 4a, 4b is a function of the number of paths 8; the bandwidth capacity of each path 8; and the physical diversity of the paths 8. In accordance with the present invention, at least two paths 8 are set up between the source and destination nodes 4a, 4b. Preferably, three or more paths 8 are utilized, in order to minimize the effect (in terms of loss of aggregate bandwidth) of the loss of any one path 8. In addition to utilizing a plurality of paths, physical diversity among the paths is preferably maximized, in order to reduce the impact of a failure of any one physical network resource.

In this respect, the path array 12 may be used to check the physical diversity of the set of paths 8 between the source node and the destination node 4b. This may be accomplished by adding the resource fields 20 of the path records 16 corresponding to the set of paths 8. The result of adding resource fields 20 in this manner provides a count of the number of paths 8 of the set which traverse any one physical network resource, and thus serves as an indication of the extent to which different communications paths 8 traverse common physical network resources. For example, in the embodiment illustrated in FIG. 1, adding the resource fields 20 of paths P1–P3 will indicate that links 6C and 6H are not traversed by any path; links 6A, 6B, 6D, 6E, 6F, 6G, 6I, 6J, 6L and 6M are traversed by a single path; and link 6K is traversed by two paths. Further evaluation of the path array 12 can be performed to identify that link 6K is traversed by paths P2 and P3, which are therefore only partially diverse, whereas path P1 is fully diverse because it does not share any physical resources (except the source and destination nodes themselves) with either of paths P2 and P3. Such partial diversity of paths P2 and P3 is unavoidable in the network topology shown in FIG. 1. However, it will be recognized that a failure of link 6K will have the effect of interrupting data communications through both of paths P2 and P3, and thus partial diversity (and/or a complete lack of diversity between paths) is undesirable. If desired, a determination may be made (e.g. based on a statistical probability of failure of each physical network resource) regarding the acceptability of more than one path traversing any particular link 6. For example, if link 6K is known to have a relatively low probability of failure, then it may be determined that routing both of paths P2 and P3 over this link is acceptable. On the other hand, if link 6L is known to have a lower probability of failure than that of link 6K, then a decision may be made to reroute one of paths P2 and P3 so that the rerouted path traverses link 6L.

It will be recognized that the source node 4a may source traffic destined for more than one destination node 4b. In such cases, the path array 12 will contain a respective set of path records for each destination node, and a diversity of paths within each set will be evaluated independently of other sets of paths.

In general, the bandwidth allocated to each path 8 may be arbitrary and may be selected by conventional means using, for example, service level agreements and quality of service requirements of the data traffic being conveyed across the network 2. These criteria may be augmented to specify that the aggregate bandwidth capacity (that is, the total capacity represented by all of the paths) is sufficient to convey all of the data traffic during normal operations of the network 2 (i.e. when all physical resources of the network are operational), and the bandwidth capacity of each path 8 is selected such that service level guarantees can be satisfied in the event of a physical resource failure affecting one (or more) of the paths 8. Typically, service level agreements specify service level guarantees that must be satisfied in the event of a failure of a single physical network resource. If two or more physical network resources fail simultaneously, the service level guarantees may not be satisfied. The use of multiple paths between the source and destination nodes 4a–4b means that it is possible for the network performance to degrade gracefully, rather than catastrophically fail, as successive simultaneous resource failures occur.

During normal operations of the network 2, data traffic received by the source node 4a that is destined for the destination node 4b is load balanced across all of the paths 8 mapped between the source and destination nodes 4a and 4b, with each path 8 carrying a portion of the total data traffic. Preferably, the traffic is distributed such that each path 8 carries approximately an equal proportion of the total traffic flow. Thus all of the paths are "working", in the sense that they are carrying data traffic of ongoing communications sessions, and there is no explicit provisioning of protection resources. As a result, none of the bandwidth capacity of the physical network infrastructure is dedicated to providing protection, and thus the utilization of network resources is maximized. Traffic flow protection is provided by physical diversity between multiple communications paths, in combination with the distribution of bandwidth capacity among those paths and the ability to prioritize traffic flow in accordance with differing service level agreements and quality of service requirements.

Figure 2:
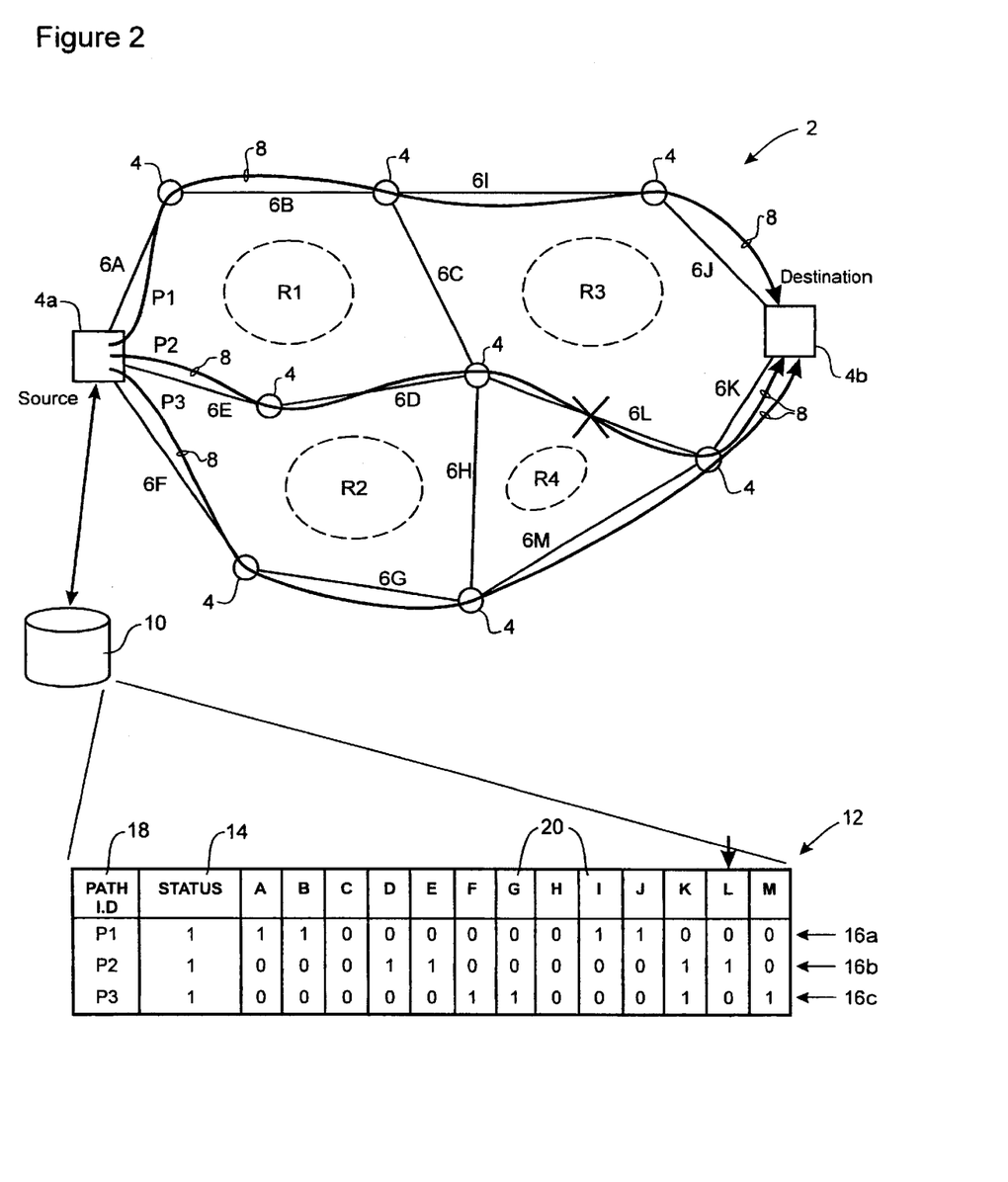
FIGS. 2 and 3 are block diagrams schematically illustrating operation of the present invention following a network resource failure.
Figure 3:
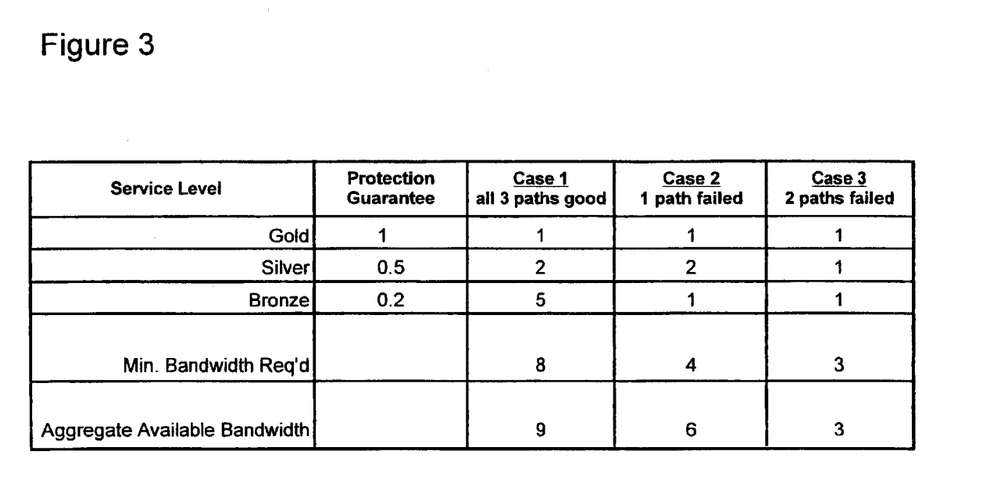

FIG. 2 illustrates operation of the invention in the event of a physical resource failure within the network 2. In the example shown in FIG. 2, it is assumed that a physical failure affecting link 6L is detected. Upon detection of the failure, a corresponding link failure notification message containing information identifying the failed link 6L is forwarded to the source node 4a. Upon receipt of the link failure notification message, the source node 4a extracts the information identifying the failed link 6L, and uses this information to update the resource data base 10.

In general, any known searching technique may be used to search the path array 12 to locate paths affected by a physical resource failure, and update the status field 14 of that path. However, it is advantageous to structure the path array 12 and the searching algorithm to maximize the speed with which the search and update can be executed. In that respect, the structure of the path array 12 illustrated in FIGS. 1 and 2 permits each path 8 that traverses the failed link 6L to be rapidly identified by providing a resource field 20 for each network resource, and indicating resources traversed by a path 8 using indicator flags inserted into the relevant resource fields 20. This structure is amenable to rapid searching using two different methods, as follows.

A first search method is based on considering the path array 12 as a matrix (as shown in FIGS. 1 and 2), with each resource field 20 represented as a respective column. In this case, the resource identifier contained in the failure notification message can be used as an array index to identify the column (i.e. the resource field 20) corresponding to the failed resource (in this example, the resource field corresponding to link 6L, which is indicated by the arrow in FIG. 2). The path array 12 can then be searched to locate any path records having an indicator flag located in the identified resource field 20.

A second search method is based on considering the contents of the resource fields 20 of each path record as a string of bits. In this case, the resource identifier contained in the failure notification message can be used to construct a mask, which can then be ANDed with each path record 16 of the path array 12. The result of the ANDing operation is indicative of whether or not an indicator flag is present in the resource field 20 corresponding to the failed resource.

The status field 14 of any identified path records 16 can then be updated to indicate that the corresponding path 8 is in a non-operational condition. In the example illustrated in FIG. 2, an indicator flag (binary "1") appears in the link 6L resource field 20 for path P2, so that the status field 14 for path P2 is changed (e.g. to binary "0") to indicate the non-operational status of the path 8. As an alternative, the path records 16 corresponding to any non-operational paths (in this case path P2), can simply be deleted from the path array 12, such that the path array 12 contains a listing of only those paths 8 that are operational.

Following update of the path array 12, the source node 4a continues load-balancing received traffic destined for the destination node 4b, but uses only those paths that remain in an operational state. Thus, the source node 4a compensates for failure of link 6L by routing traffic away from the affected path P2, and on to the remaining operational paths P1 and P3. Conventional techniques may be employed in an effort to restore link 6L and/or reroute path P2 to avoid link 6L. It is also possible to define appropriate signaling, layer 1 and/or in layer 2/3 to notify the source node 4a of any subsequent changes in the status or routing of non-operational paths. Accordingly, if any path repair or restoration efforts are successful, the path array 12 can be updated accordingly to indicate new resources traversed by path P2 (if any) and the return to an operational status of path P2, following which the source node 4a can resume forwarding traffic through path P2.

Link failure detection may be accomplished using conventional layer-1 failure detection techniques known in the art, and may result in the generation of a substantially conventional link failure notification message. For example, it is well known that upon detection of a link failure, conventional BLSR alarm signaling techniques produce a link failure notification message that is propagated hop-by-hop around the affected ring. Upon receipt of the link failure notification message, each node forwards the message, and then switches incoming traffic that is destined for points downstream of the failed link onto provisioned protection resources in order to route the traffic around the failed link. With the elimination of provisioned protection resources, this functionality is redundant. However, the rapid fault detection and layer-1 alarm message propagation that is exemplified by BLSR alarm signaling can be used to advantage in the present invention.

In particular, conventional BLSR alarm signaling can be modified so that a link failure notification message received at any node is forwarded over all upstream links from which the node receives traffic, including those on adjoining rings. This means that notification of a link failure within the network core will rapidly be propagated (within layer-1) to each node on the network edge that is sourcing traffic into the network (including source node 4a). When the link failure notification message arrives at an edge node, it is passed up to layers 2 and 3 for processing. Each edge node then extracts information identifying the failed link, and uses the information to search and (if necessary) update its path data base 10. If an edge node is sourcing traffic into one or more paths traversing the failed link, its path database 10 is updated to indicate a non-operational status of any such path. Thus, the workload associated with re-routing layer-2/3 traffic flows away from the failed link is distributed among many nodes at the network edge, thereby facilitating rapid recovery without dramatically increasing processing power in each node.

Accordingly, in the embodiment shown in FIG. 2, failure of link 6L results in the generation of a link failure notification message that is propagated through the network 2 and received by the source node 4a via link-path 6D-6E (and possibility via link paths 6A-6B-6C and 6F-6G-6H) . By transferring the link failure notification message to the source node within layer-1, the delay between the occurrence of the failure and delivery of the failure notification message to the source node 4a is minimized. Compensation for the link failure is then accomplished within the source node 4a by searching and updating the path data-base 10, which can also be accomplished very quickly. Thus, a mesh network in accordance with the invention rapidly adapts to a failed link.

As mentioned previously, the bandwidth capacity of each path 8 is preferably selected such that, under normal operating conditions, the aggregate bandwidth capacity of all operational paths between the source and destination nodes is sufficient to carry all of the traffic received by the source node and destined for the destination node. It is possible that the aggregate bandwidth capacity of all of the paths may exceed the bandwidth requirements to an extent that one or more paths may be rendered non-operational by physical resource failures before the bandwidth requirements of the traffic flow exceeds the aggregate capacity of the remaining operational paths. In such cases, load balancing of traffic across remaining operational paths can continue with little or no disruption of service to end users. Eventually, however, the loss of other paths may result in a situation in which the aggregate bandwidth capacity of the remaining operational paths is less than the bandwidth required to convey all of the traffic arriving at the source node 4a. In this case, logical prioritization of traffic flows in accordance with service level agreements and quality of service requirements can facilitate a graceful degradation of network performance.

Thus it will be seen that the present invention provides a method and apparatus for rapidly compensating for physical network resource failures to satisfy service level agreements and quality of service guarantees, while ensuring a high efficiency of utilization of network bandwidth capacity by eliminating the requirement for provision of protection bandwidth within the network.

While the present invention has been described with reference to embodiments deployed on a physical network infrastructure having a ring topology, it should be recognized that the invention may also be deployed in networks having a mesh topology.

The embodiments of the invention described above is(are) intended to be exemplary only. The scope of the invention is therefore intended to be limited solely by the scope of the appended claims.

I claim:

1. A method of compensating for network resource failures in a communications network, the method comprising the steps of:
    a) establishing a set of at least two communications paths across the network between a source node and a destination node, the set of communications paths being at least partially physically diverse;
    b) compiling a path database at the source node including information identifying network resources traversed by each communications path;
    c) monitoring at the source node a status of each path in the set of communications paths; and
    d) load-balancing data traffic across each path in the set of communications paths having an operational status.

2. A method as claimed in claim 1, wherein each communications path comprises any one of an ATM-SVC, and a Label Switched Path (LSP).

3. A method as claimed in claim 1, wherein the step of establishing the set of communications paths comprises, for each communications path, steps of:
    a) launching a path setup message from the source node; and
    b) receiving a resource allocation message at the source node in response to the path setup message, the resource allocation message including information identifying a network resource traversed by the communications path.

4. A method as claimed in claim 3, wherein the resource allocation message is generated by a node in the communications path as resources of a downstream hop are allocated to the communications path.

5. A method as claimed in claim 3, wherein the step of compiling a path database comprises a step of updating a path array of the path database on the basis of the information identifying the network resource.

6. A method as claimed in claim 5, wherein the path array comprises, for each communications path, a respective path record having a plurality of resource fields respectively corresponding to one or more network resources which may be traversed by the communications path.

7. A method as claimed in claim 6, wherein each network resource comprises any one or more of: a physical network link; a physical network node; a logical connection between a pair of network nodes; a SONET/SDH section; and a SONET/SDH line.

8. A method as claimed in claim 6, wherein a resource field identifies a single network resource.

9. A method as claimed in claim 6, wherein a resource field identifies a logical combination of two or more network resources.

10. A method as claimed in claim 6, wherein the step of updating the path array comprises a step of inserting an indicator flag into the resource field associated with the resource identified in the resource allocation message.

11. A method as claimed in claim 10, wherein the indicator flag comprises a binary "1".

12. A method as claimed in claim 6, further comprising a step of verifying a physical diversity of the set of communications paths.

13. A method as claimed in claim 12, wherein the step of verifying a physical diversity of the set of communications paths comprises a step of adding the resource fields of the respective path records, to thereby calculate a number of paths within the set of communications paths that traverse each physical resource of the network.

14. A method as claimed in claim 1, wherein the step of monitoring the status of each path in the set of communications paths comprises steps of:
    a) receiving a failure notification message including information indicative of a failed network resource; and
    b) setting a non-operational status for each communications path that traverses the failed network resource.

15. A method as claimed in claim 14, further comprising steps of:
    a) detecting the failure of a network resource at a detecting node;
    b) generating the failure notification message indicative of the failure; and
    c) propagating the failure notification message from the detecting node toward the source node.

16. A method as claimed in claim 15, wherein the failure is detected using conventional layer-1 link failure detection.

17. A method as claimed in claim 16, wherein the failure notification message is a layer-1 link failure alarm message including a link identifier indicative of the failed resource.

18. A method as claimed in claim 17, wherein the failure notification is propagated within layer-1 until it is received at the source node.

19. A method as claimed in claim 18, wherein at each node within the network, the failure notification is launched into every upstream link from which the node is receiving traffic, whereby the failure notification is propagated toward every edge node sourcing traffic destined for points downstream of the failed resource.

20. A method as claimed in claim 14, wherein the step of setting a non-operational status for each communications path that traverses the failed network resource comprises the steps of:
    a) searching a path array to identify each path that traverses the failed resource; and
    b) one of:
        i) updating a status field associated with each identified path to indicate a non-operational status of the path; and
        ii) deleting a respective path record associated with each identified path from the path array.

21. A method as claimed in claim 20, wherein the step of searching the path array comprises searching the path array using the information indicative of the failed resource as an array index.

22. A method as claimed in claim 20, wherein the step of searching the path array comprises the steps of:
   a) generating a mask of the failed resource using the information indicative of the failed resource; and
   b) ANDing the mask with each path record of the path.

23. A method as claimed in claim 1, wherein the step of load-balancing data traffic comprises a step of prioritizing the data traffic based on at least one of service level agreements and QoS guarantees associated with the data traffic.

24. A node in a communications network adapted to compensate for network resource failures in the communications network, the node comprising:
   a) means for establishing a set of two or more communications paths across the network to a destination node, the set of communications paths being at least partially physically diverse;
   b) a path database adapted to maintain information identifying physical network resources traversed by each communications path;
   c) means for monitoring a status of each one of the set of communications paths; and
   d) means for load-balancing the data traffic across communications paths of the set of paths that have an operational status.

25. A node as claimed in claim 24, wherein each communications path comprises any one of an ATM-SVC, and a Label Switched Path (LSP).

26. A node as claimed in claim 24, wherein the means for establishing the set of communications paths comprises:
   a) means for launching a path setup message toward the destination node to initiate a setup of each communications path;
   b) means for receiving a resource allocation message in response to each path setup message, the resource allocation messages including information identifying network resources traversed by a communications path; and
   c) means for updating the path database using the information identifying the network resource.

27. A node as claimed in claim 26, wherein the resource allocation message is generated by a node in a communications path as network resources of a downstream hop are allocated to the communications path.

28. A node as claimed in claim 24, wherein the path database comprises, for each communications path, a respective path record having a plurality of resource fields, each resource field corresponding to one or more network resources which may be traversed by a communications path.

29. A node as claimed in claim 28, wherein each network resource comprises any one or more of: a physical network link; a physical network node; a logical connection between a pair of network nodes; a SONET/SDH section; and a SONET/SDH line.

30. A node as claimed in claim 28, wherein a resource field corresponds to a single network resource.

31. A node as claimed in claim 28, wherein a resource field corresponds to a logical combination of two or more network resources.

32. A node as claimed in claim 28, wherein the means for updating the path array comprises means for inserting an indicator flag into a resource field corresponding to the resource identified in the resource allocation message.

33. A node as claimed in claim 32, wherein the indicator flag comprises a binary "1".

34. A node as claimed in claim 28, further comprising means for verifying a physical diversity of the set of communications paths.

35. A node as claimed in claim 34, wherein the means for verifying a physical diversity of the set of communications paths comprises means for adding the resource fields of the respective path records.

36. A node as claimed in claim 24, wherein the means for monitoring the status of each one of the set of communications paths comprises:
   a) means for receiving a failure notification message including information indicative of a failed network resource; and
   b) means for setting a non-operational status for each communications path that traverses the failed network resource.

37. A node as claimed in claim 36, wherein the means for setting a non-operational status for each communications path that traverses the failed network resource comprises:
   a) means for searching the path database to identify each path that traverses the failed resource; and
   b) one of:
      i) means for updating a status field associated with each identified path to indicate a non-operational status of the corresponding path; and
      ii) means for deleting a respective path record associated with each identified path from the path database.

38. A node as claimed in claim 37, wherein the means for searching the path database comprises:
   a) means for identifying a resource field of the path database corresponding to the failed resource using the information indicative of the failed resource as an array index; and
   b) means for searching the path database to locate a respective path record associated with each path having an indicator flag in the identified resource field.

39. A node as claimed in claim 37, wherein the means for searching the path database comprises:
   a) means for generating a mask of the failed resource using the information indicative of the failed resource; and
   b) means for ANDing the mask with each path record.

40. A node as claimed in claim 24, wherein the means for load-balancing data traffic comprises means for prioritizing the traffic based on one or more of predetermined service level agreements and QoS guarantees.

41. A system for compensating for network resource failures in a communications network comprising a plurality of nodes interconnected by links, the system comprising:
   a) means for establishing a set of two or more communications paths across the network between a source node and a destination node, the set of communications paths being at least partially physically diverse;
   b) a path database adapted to maintain information identifying physical network resources traversed by each communications path;
   c) means for monitoring a status of each one of the set of communications paths; and
   d) means for load-balancing the data traffic across ones of the set of communications paths having an operational status.

42. A system as claimed in claim 41, wherein each communications path comprises any one of an ATM-SVC, and a Label Switched Path (LSP).

43. A system as claimed in claim 41, wherein the means for establishing the set of communications paths comprises:

a) means for launching a path setup message in respect of a communications path from the source node;

b) means responsive to the path setup message for allocating a network resource to the communications path in a node intermediate the source and destination nodes;

c) means for receiving resource allocation messages at the source node, each resource allocation message including information identifying the network resource allocated to the communications path by the intermediate node; and d) means for updating the path database maintained by the source node using the information identifying the allocated network resource.

44. A system as claimed in claim 43, wherein a resource allocation message is generated by each node in the communications path as network resources of a downstream hop are allocated to the communications path.

45. A system as claimed in claim 43, wherein the path database comprises, for each communications path, a respective path record having a path identifier field and a plurality of resource fields, each resource field corresponding to one or more network resources which may be traversed by a communications path.

46. A system as claimed in claim 45, wherein each network resource comprises any one or more of: a physical network link; a physical network node; a logical connection between a pair of network nodes; a SONET/SDH section; and a SONET/SDH line.

47. A system as claimed in claim 45, wherein a resource field corresponds to a single network resource.

48. A system as claimed in claim 45, wherein a resource field corresponds to a logical combination of at least two network resources.

49. A system as claimed in claim 45, wherein the means for updating the path database comprises means for inserting an indicator flag into the respective resource field corresponding to the resource identified in the resource allocation message.

50. A system as claimed in claim 49, wherein the indicator flag comprises a binary "1".

51. A system as claimed in claim 45, further comprising means for verifying a diversity of each of the set of communications paths.

52. A system as claimed in claim 51, wherein the step of verifying a diversity of each of the set of communications paths comprises a step of adding the resource fields of the respective path records.

53. A system as claimed in claim 41, wherein the means for monitoring the status of each one of the set of communications paths comprises:

a) means for receiving a failure notification message at the source node, the failure notification message including information indicative of a failed network resource; and b) means for setting a non-operational status of each communications path that traverses the failed network resource.

54. A system as claimed in claim 53, further comprising:

a) means for detecting a failure of a network resource at a detecting node proximal the failed network resource;

b) means for generating the failure notification message indicative of the failure; and c) means for propagating the failure notification message from the detecting node toward the source node.

55. A system as claimed in claim 54, wherein the failure is detected by the detecting node using a conventional layer-1 link failure detection technique.

56. A system as claimed in claim 55, wherein the failure notification message is a substantially conventional layer-1 link failure alarm message including a link identifier indicative of the failed resource.

57. A system as claimed in claim 56, wherein the failure notification is propagated within layer-1 until it is received at the source node.

58. A system as claimed in claim 57, further comprising means operative in each node for launching the failure notification to every upstream link from which the node is receiving traffic, whereby the failure notification is propagated toward every edge node sourcing traffic destined for points downstream of the failed resource.

59. A system as claimed in claim 53, wherein the means for setting a non-operational status of each communications path that traverses the failed network resource comprises:

a) means for searching the path database to identify each path that traverses the failed resource; and b) one of:
i) means for updating a respective status field associated with each identified path to indicate a non-operational status of the corresponding path; and
ii) means for deleting a respective path record associated with each identified path from the path database.

60. A system as claimed in claim 59, wherein the wherein the means for searching the path database comprises:

a) means for identifying a resource field of the path database corresponding to the failed resource using the information indicative of the failed resource as an array index; and b) means for searching the path database to locate a respective path record associated with each path having an indicator flag in the identified resource field.

61. A system as claimed in claim 59, wherein the means for searching the path database comprises:

a) means for generating a mask of the failed resource using the information indicative of the failed resource; and b) means for ANDing the mask with each path record of the path database.

62. A system as claimed in claim 41, wherein the means for load-balancing data traffic comprises means for prioritizing the data traffic based on at least one of service level agreements and QoS guarantees.

* * * * *